United States Patent [19]

Lang

[11] 4,413,472
[45] Nov. 8, 1983

[54] HIGH-PRESSURE PUMP WITH PRESSURE REGULATOR

[75] Inventor: Armin Lang, Schwabisch, Fed. Rep. of Germany

[73] Assignee: Zahnradfabrik Friedrichshafen, AG., Friedrichshafen, Fed. Rep. of Germany

[21] Appl. No.: 172,032

[22] Filed: Jul. 24, 1980

[30] Foreign Application Priority Data

Jul. 25, 1979 [DE] Fed. Rep. of Germany ....... 2930107

[51] Int. Cl.³ .......................................... F15B 13/02
[52] U.S. Cl. ..................................... 60/420; 60/468; 91/529; 417/295
[58] Field of Search ................. 60/420, 468; 137/491, 137/506; 417/307, 308, 304, 302, 295; 91/528, 529

[56] References Cited

U.S. PATENT DOCUMENTS

| 2,388,820 | 11/1945 | Bonnell | 137/491 |
| 2,447,441 | 8/1948 | Tweedale | 60/468 |
| 3,613,717 | 10/1971 | Smith | 137/491 |
| 3,720,059 | 3/1973 | Schurawski et al. | 91/528 X |
| 3,906,839 | 9/1975 | Schexnayder | 137/491 X |
| 3,982,855 | 9/1976 | Aldinger | 417/295 X |

FOREIGN PATENT DOCUMENTS 2425022 12/1975 Fed. Rep. of Germany .

Primary Examiner—Gerald A. Michalsky
Attorney, Agent, or Firm—Zalkind & Shuster

[57] ABSTRACT

One or more pressure regulators limit the operating pressure of fluid supplied to a fluid pressure operated device from a common pump and control the level of the operating pressure through pilot valves connected to the regulators. Each fluid operated device is connected by its regulator to a common fluid reservoir when flow is blocked in the pump pressure and suction lines to limit the operating pressure while minimizing pump drive energy loss.

6 Claims, 3 Drawing Figures

HIGH-PRESSURE PUMP WITH PRESSURE REGULATOR

BACKGROUND OF THE INVENTION

The invention relates to a high-pressure pump having a pressure regulator. Such a high-pressure pump (for example in German Offenlegungsschrift No. 24 25 022) is provided with a pressure-limiting valve which is accommodated in a transverse boring of the intake connection. In this arrangement, the suction flow of the pump is regulated in dependence on the working pressure acting on the one end face of the pressure-limiting valve and a spring pressing on the other end face. When the maximum pressure has been reached the pressure-limiting valve establishes a connection between the pressure side and the intake connection. This known pressure-limiting device cannot be remotely controlled.

SUMMARY OF THE INVENTION

It is the basic object of the invention to produce a reciprocating piston pump the pressure regulator of which is constructed in a space-saving manner and which can be produced cost-effectively and is suitable for constructing a central hydraulic system with low energy consumption.

The installation in accordance with the invention, consisting of a pump and a pressure regulator, is particularly suitable for providing a motor vehicle with a central hydraulic system in which several pressure regulators can be arranged in series as modular components. In this arrangement each consumer, such as the vehicle brake, a level control system and a central hydraulic locking system, can be controlled via a separate pressure regulator including a pilot valve. If the central hydraulic system is simultaneously used to feed a power-assisted steering system, a pressure regulator and pilot valve is required for each direction of steering. The invention ensures a very rapid hydraulic response with very low energy consumption.

BRIEF DESCRIPTION OF DRAWING FIGURE

Further advantages and characteristics of the invention are explained hereinafter in greater detail with the aid of the accompanying drawings showing two illustrative embodiments, wherein.

DETAILED DESCRIPTION OF PREFERRED EMBODIMENTS

Figure 1:
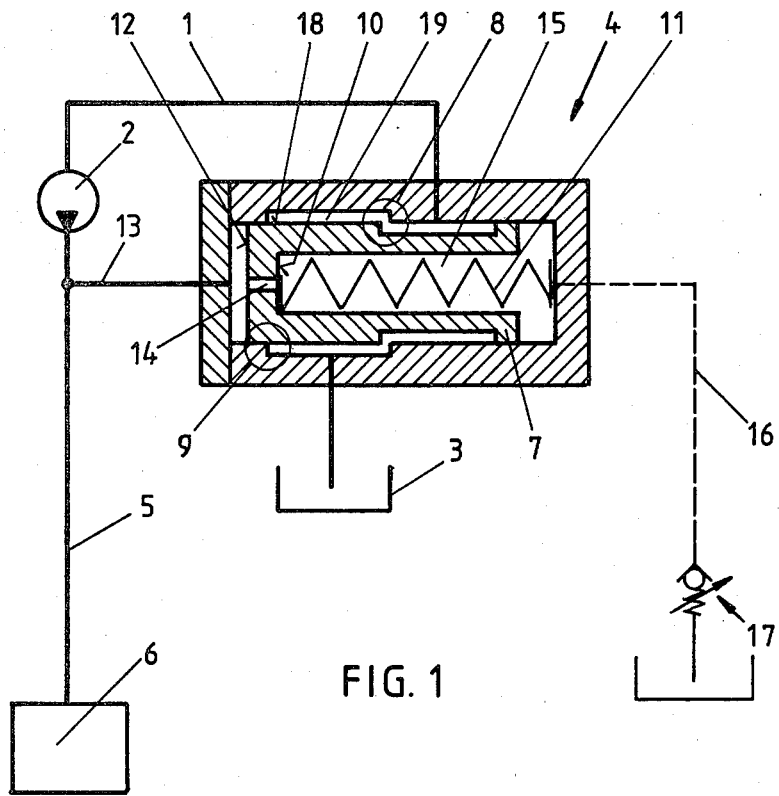
FIG. 1 is a fluid circuit diagram with a pressure regulator shown in section for a remote controlled pump and one consumer.

According to FIG. 1, a pressure regulator 4, which is constructed as a pressure balance, is inserted into a suction line 1 which connects a pump 2 to a reservoir 3. A pressure line 5 of the pump 2 leads to a consumer 6. The pressure regulator 4 consists of a piston 7 with valve control edges at 8 and 9. An internal end face 10 of the piston 7 is loaded by a spring 11. The other external end face 12 of the piston is exposed to pressurized fluid via a line 13 to the pressure line 5. Fluid is conducted between the two end faces 10 and 12 by a throttle passage 14. An axial bore or chamber 15 in the piston for accommodating the spring 11 is in fluid communication via a control line 16 with a pilot valve 17. A control shoulder portion 18 of the piston 7 is constructed to be wider than an associated suction groove portion 19.

In an initial position of the piston 7 shown in FIG. 1, the suction line 1 is connected to the reservoir 3 via the wide-open passage at control edge 8. The pump 2 is working in the normal way. As soon as the consumer 6 opposes the flow of fluid delivered by the pump 2 with a resistance, the operative pressure at the end face 12 of the piston 7 rises. A portion of the pump flow is fed via the line 13, the throttle passage 14, the chamber 15 and the control line 16 to the pilot valve 17. The pressure regulator now works as a pressure balance in the sense of a flow-limiting valve, in such a manner that flow in the control line 16 is exactly related to the pressure difference at the pressure balance and to the cross-section of the throttle passage 14. An impressed control current flow is regulated at the control edge 8 in the direction of the consumer 6 and at the control edge 9 if flow is in the direction of the pump 2. Thus the pressure line 5 can be connected directly to the reservoir 3 via the control edge 9 if the pressure oil flows back. This means that the consumer 6 does not require its own reservoir connection. The pressure in the consumer 6 is always equal to that set at the pilot valve 17, increased by the pressure difference of the pressure regulator 4. Due to the fact that the control shoulder portion 18 of the piston 7, working in conjunction with the suction groove portion 19, is wider, the pressure lines 5 and 13 can be relieved via the control edge 9 only when the control edge 8 controlling the intake flow is closed.

Due to the different dimensions of the two end faces 10 and 12 of the piston 7, pressure transformation is possible. If the end face 10, facing the spring 11, is larger than the end face 12 connected to the pressure line 5, the pressure in the pilot valve 17 is correspondingly less.

Figure 2:
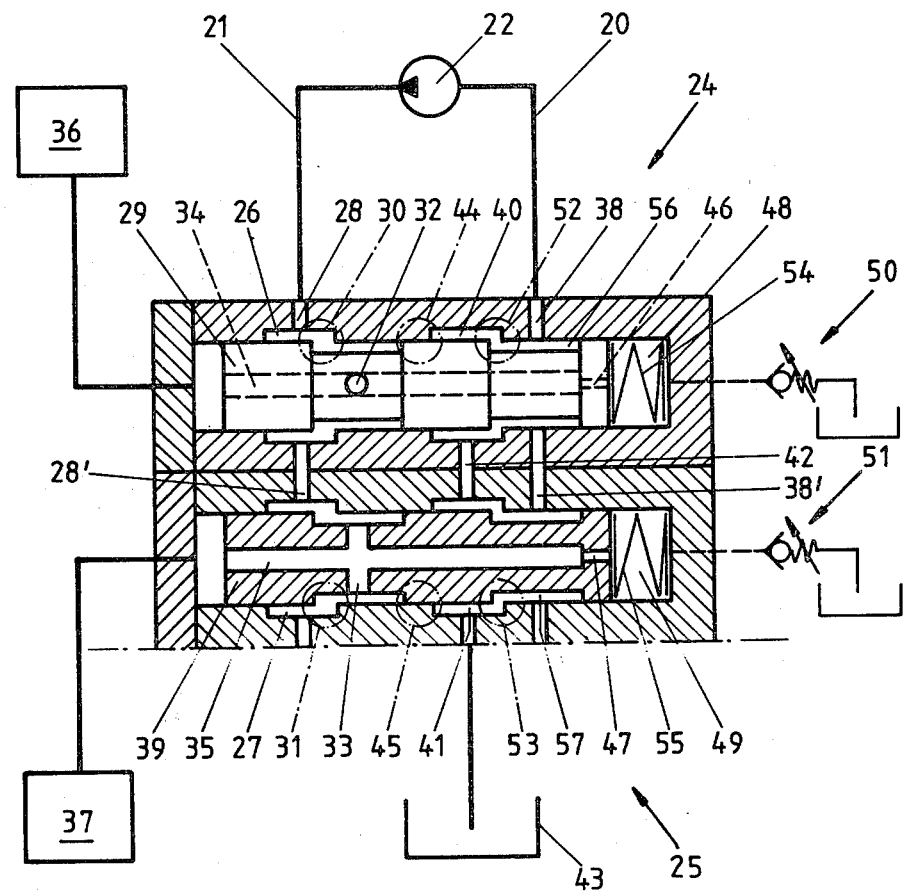
FIG. 2 is a fluid circuit diagram with pressure regulators shown in section for a central hydraulic system and two consumers.

FIG. 2 shows an installation consisting of a pump 22 and at least two pressure regulators 24, 25 for a central hydraulic system and a corresponding number of consumers 36 and 37 of equal status. Here a pressure line 21 is connected via transverse ducts 28 and 28' to inlet grooves 26 and 27 of the respective pressure regulators 24 and 25. The intake of pressure oil from the inlet groove 26 and 27 is controlled by valve control edges at 30 and 31. The pressure oil then reaches those end faces of the piston 29 and 39, remote from springs 54 and 55, to be fed to the consumers 36 and 37, via transverse holes 32 and 33 and longitudinal bores 34 and 35. A suction line 20 of the pump 22 is connected via the transverse ducts 38 and 38' to the suction grooves 56 and 57 formed in the pistons 29 and 39. These suction grooves 56 and 57, in turn, are connected to a reservoir 43 via the reservoir grooves 40 and 41 in the regulator housing which, for their part, are joined to each other via a transverse duct 42. An associated one of the valve control edges 52 and 53 controls the intake cross-section from the reservoir. Additional valve control edges 44 and 45 can be used to connect the associated consumers 36 and 37 directly to the reservoir 43. The longitudinal bores 34 and 35 are connected to chambers 48 and 49 via throttle passages 46 and 47. The chambers 48 and 49, in turn, are connected via control lines to pilot valves 50 and 51. The control edges of the pistons 29 and 39 are designed in such a manner that the control edges at 30 and 31 for the pressure oil intake is already closed when the control edges at 44 and 45 open for the pressure oil return flow.

In the installation according to the invention, the pump 22 always delivers only the quantity of oil required in each case. As soon as the consumption in one of the consumers 36 or 37 decreases, the intake cross-section of the transverse duct is appropriately reduced by the control edge at 52 or 53. The highest flow to be delivered is determined by the consumer with the highest working flow.

Similarly, the highest system pressure is determined by the consumer with the highest working pressure, due to the fact that the associated control piston determines as the last one the intake cross-section of the pump and thus also the delivery pressure. The working pressure of the other consumers is determined by the control edge at 30 or 31, the controllable cross-section of which is dependent on the force of the springs 54 and 55 and the respective pilot pressures.

Figure 3:
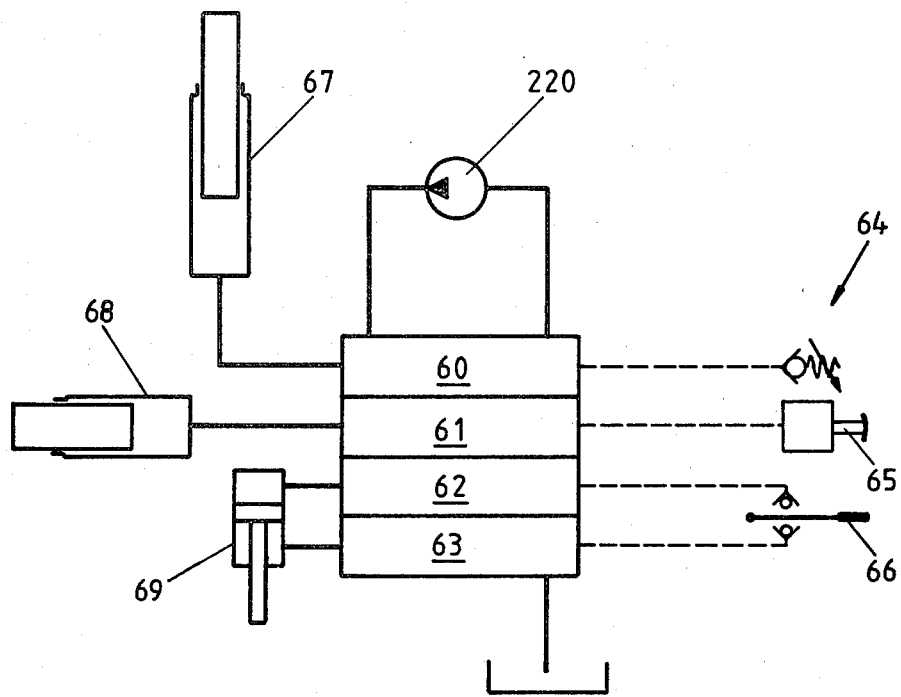
FIG. 3 is a fluid circuit diagram of another central hydraulic system with which the invention may be associated.

As can be seen in FIG. 3 in greater detail, the above-mentioned installation of FIG. 2 may be extended as necessary. This central hydraulic system, for example, servicing a construction machine, consists of a pump 220 and several pressure regulators 60, 61, 62 and 63 which are screwed together in a so-called sandwich construction. The pilot valves 64, 65 and 66 are used for actuating, for example, two lifting cylinders 67 and 68 and a doubly-loaded steering motor 69 of a power-assisted steering system.

I claim:

1. In combination with a fluid operated device, a fluid reservoir, a pump having suction and pressure lines, a fluid supply line connected to the fluid operated device, and a pressure regulator connected to the reservoir and located between said suction and pressure lines, including a control piston (7, 29, 39) having opposed end faces (10 and 12) and spring means (11-15, 48-54, 49-55) loading one of the end faces (10) for restricting flow through the suction line as a function of operating pressure of fluid in the supply line to which the other of the end faces (12) is exposed and blocking flow through the suction line at a predetermined level of the operating pressure in response to which the pressure line is connected to the reservoir, the improvement comprising restricted passage means (14, 46, 47) in the piston for conducting restricted flow of the fluid between the opposed end faces thereof, to automatically vary flow in the suction line, and pressure responsive pilot means (17, 50, 51, 64) operatively associated with said spring means for controlling the operating pressure through the pressure regulator.

2. The combination of claim 1 wherein the piston (7) has a longitudinal axis and further includes a suction groove portion (19) and a control shoulder portion (18) dimensionally larger than the suction groove portion transversely of said axis.

3. In a fluid supply system as defined in claim 1 wherein a plurality of said fluid operated devices (36, 37, 67, 68, 69) are serviced in common by said pump (22, 22a) and said fluid reservoir (43) through a plurality of said pilot valve means (50, 51, 64) and a plurality of said pressure regulators (24, 25, 60-63) corresponding thereto, each of said regulators further including a housing within which is formed a controllable suction groove (56, 57), a controllable reservoir groove (40, 41) and a controllable inlet groove (26, 27), each of the control pistons (29, 39) having an axial bore (34, 35) conducting fluid between the other of the end faces and the restricted passage means (46, 47) thereof, and duct means interconnecting the controllable inlet grooves in series with the pressure line (21) of the pump, the controllable suction grooves in series with the suction line (20) and the controllable reservoir grooves in series with the reservoir, each of the control pistons being operative to control pressure in the inlet groove associated therewith in dependence on the operating pressure of the associated fluid operated device and adjustment of the associated pilot valve means.

4. The system as defined in claim 3 including valve passage means (30, 31, 44, 45, 52, 53) for conducting fluid flow between the fluid operated devices and the reservoir when flow is blocked in the inlet and suction grooves (26, 27, 56, 57).

5. The system as defined in claim 4 wherein the fluid operated devices include lifting cylinders (68, 67) and a power-assisted steering unit (69).

6. In combination with a pump having suction and pressure ports respectively in fluid communication with a fluid reservoir and a fluid operated device, and a pressure regulating valve device operatively connected between the suction and pressure ports for restricting pump suction flow to the suction port from the reservoir, the improvement comprising means for minimizing energy losses resulting from variable loading of the fluid operated device, including restricted passage means in the pressure regulating device for establishing a bias varying as a function of pump pressure at the pressure port, means responsive to said varying bias for automatically controlling operation of the pump in dependence on the loading on the fluid operated device by control of said pump suction flow, a remote pressure responsive relief valve, and fluid conduit means connecting the remote relief valve to the regulating valve device for controlling said varying bias to limit the pump pressure.

* * * * *